United States Patent [19]

Kuhn, Jr.

[11] Patent Number: 5,654,788
[45] Date of Patent: Aug. 5, 1997

[54] CARTRIDGE SENSING DEVICE

[75] Inventor: Robert Louis Kuhn, Jr., Rush, N.Y.

[73] Assignee: Eastman Kodak Company, Rochester, N.Y.

[21] Appl. No.: 385,292

[22] Filed: Feb. 10, 1995

[51] Int. Cl.$^6$ .................................................. G03B 17/26
[52] U.S. Cl. ............................................ 396/284; 396/515
[58] Field of Search ............................... 354/275, 174, 354/152

[56] References Cited

U.S. PATENT DOCUMENTS

| | | | |
|---|---|---|---|
| 4,994,828 | 2/1991 | Smart | 354/21 |
| 5,032,861 | 7/1991 | Pagano | 354/275 |
| 5,047,794 | 9/1991 | Pagano et al. | 354/275 |
| 5,049,912 | 9/1991 | Pagano et al. | 354/275 |
| 5,049,913 | 9/1991 | Pagano et al. | 354/275 |
| 5,079,579 | 1/1992 | Pagano et al. | 354/275 X |
| 5,079,799 | 1/1992 | Rude et al. | 16/342 |
| 5,138,350 | 8/1992 | Cocca | 354/21 |
| 5,159,365 | 10/1992 | Takahashi et al. | 354/275 X |
| 5,221,939 | 6/1993 | Taniguchi et al. | 354/173.1 |
| 5,234,174 | 8/1993 | Pagano et al. | 354/275 X |
| 5,278,600 | 1/1994 | Takahashi et al. | 354/275 |
| 5,280,237 | 1/1994 | Stoneham et al. | 354/275 |
| 5,296,887 | 3/1994 | Zander et al. | 354/275 |
| 5,359,378 | 10/1994 | Zander et al. | 354/275 |
| 5,382,992 | 1/1995 | Kawamura et al. | 354/21 |

*Primary Examiner*—D. Rutledge
*Attorney, Agent, or Firm*—Peter J. Bilinski

[57] ABSTRACT

An apparatus for displaying the status of a film cartridge in a camera, the cartridge having a film exposure status indicator for identifying whether the cassette is fully unexposed, partially exposed, or fully exposed. The apparatus includes a blocking member which cooperates with the status indicator of the cartridge to prevent the loading of a fully exposed film cartridge, and a multiple state switching element which cooperates with the blocking member to sense the state of a loaded cartridge. An LCD provides user feedback as to the state of the camera depending on the state of the switching element.

9 Claims, 12 Drawing Sheets

CARTRIDGE SENSING DEVICE

CROSS-REFERENCE TO RELATED APPLICATION(S)

Reference is made to commonly assigned applications Ser. No. 08/385219 entitled: DOUBLE EXPOSURE PREVENTION APPARATUS, filed in the name of Robert L. Kuhn, Jr., and Ser. No. 08/386792, entitled: DOUBLE EXPOSURE PREVENTION APPARATUS FOR THRUST TYPE CARTRIDGES, filed in the names of J. David Cocca, Paul L. Taillie, and Beth A. O'Leary, each of which are assigned to the assignee of this application.

FIELD OF THE INVENTION

The invention relates generally to the field of photography, and in particular to cameras. More specifically, the invention relates to a device which provides user feedback for a camera using thrust type film cartridges.

BACKGROUND OF THE INVENTION

In thrust type 35 mm film manufacturers' cassettes, such as those manufactured by Eastman Kodak Co. and Fuji Film Photo Ltd., a leading portion of a film strip is thrust from the confines of a loaded film cassette onto a take-up spool rather than having to manually extract the protruding leading portion, as is common to other conventional non-thrusting film cassettes. This is particularly advantageous in that a protruding portion of the film is not required and that a user does not have to take the time to manually extend the leading portion of the film for cinching to a take-up spool prior to image capture.

Another advantage realized using thrust type film cassettes is that a partially exposed film can be rewound into the cassette, and be extracted from the confines of the camera. The cassette can then be reloaded into a camera having a control system and associated logic for allowing the film strip to be thrust from the cassette and properly advanced to the next exposable frame prior to image capture. The features of rewinding a partially exposed film back into the cassette and for subsequent exposure of the previously unexposed film is referred to as mid-roll interrupt (MRI).

In commonly assigned U.S. patent application 4,994,828, an apparatus is described for preventing a film cartridge having previously exposed film from being reloaded into a film loading chamber of a camera. A blocking member having an engageable end is spring biased into the loading chamber and cooperates with the film status indicator of a film cartridge to prevent the cartridge from being loaded in the film chamber if the cartridge contains exposed film. When the film cartridge, however, contains unexposed, or in the case of cameras having MRI logic, partially exposed film, the blocking member is pivoted out of the chamber and the cartridge can be loaded.

In commonly assigned and concurrently filed U.S. application Ser. Nos. and 08/385,291 and 08/386,792, a sensing member cooperates with the above described blocking member to prevent the double exposure of film contained in an unblocked film cassette and loaded in the film loading chamber. The sensing member senses the presence of a film cassette in the chamber and trips a resettable switch, which allows the unexposed film in the cassette to be loaded for exposure. The reloading of film is prevented, however, until the switch is reset and subsequently reopened. Though an efficient means for preventing double exposure is described by these references, particularly for thrusting type cartridges, there is no feedback provided to the user other than disablement of the camera, leading to possible confusion and dissatisfaction.

There is a need for the user to understand the state of a camera, such as whether a cassette or cartridge and/or the film contained therein have been loaded, without recourse to opening the film loading chamber door, or first removing the film cartridge from the camera.

SUMMARY OF THE INVENTION

The present invention is directed to overcoming one or more of the problems set forth above. Briefly summarized, according to one aspect of the present invention, there is provided an apparatus for displaying the status of a film cartridge in a camera, the cartridge having a film exposure status indicator for identifying whether said cassette contains film which is fully unexposed, partially exposed, or fully exposed, said apparatus including a blocking member which cooperates with the status indicator of said cartridge to prevent the loading of a fully exposed film cartridge and allowing the loading of a fully unexposed film cartridge, characterized by:

sensing means cooperating with the blocking member for sensing the state of a cartridge in the loading chamber; and display means cooperating with said sensing means for displaying status of the cartridge, depending on the state of said sensing means.

According to another aspect of the invention, there is provided an apparatus for displaying the status of a film cartridge in a camera, said cartridge having a film exposure status indicator for identifying whether said cassette contains film which is fully unexposed, partially exposed, or fully exposed, said apparatus including a blocking member which cooperates with the status indicator of said cartridge to prevent the loading of a fully exposed film cartridge, is characterized by:

a movable switching element which cooperates with the blocking member to move from a first position when no cartridge is present in said film loading chamber to a second position when a cartridge containing exposed film is blocked in said chamber, and to a third position when a cartridge is unblocked by said blocking member; and, a display device coupled to said switching element for displaying a visually perceivable indication as to the state of the camera loading chamber.

An advantage provided by the present invention is that feedback as to the state of a camera, including a loaded thrust type film cartridge is readily available to a user having a camera according to the present invention.

These and other aspects, objects, features and advantages of the present invention will be more clearly understood and appreciated from a review of the following Detailed Description of the Preferred Embodiments and appended Claims, and by reference to the accompanying Drawings.

DETAILED DESCRIPTION OF THE INVENTION

The invention is disclosed as being embodied preferably in a still photographic camera. Because the features of this type of camera are generally well known, the description which follows is directed in particular to elements forming part of or cooperating directly with the disclosed embodiment. It is to be understood, however, that other elements not specifically shown or described may take various forms known to persons ordinarily skilled in the art.

The Film Cassette

Figure 1:
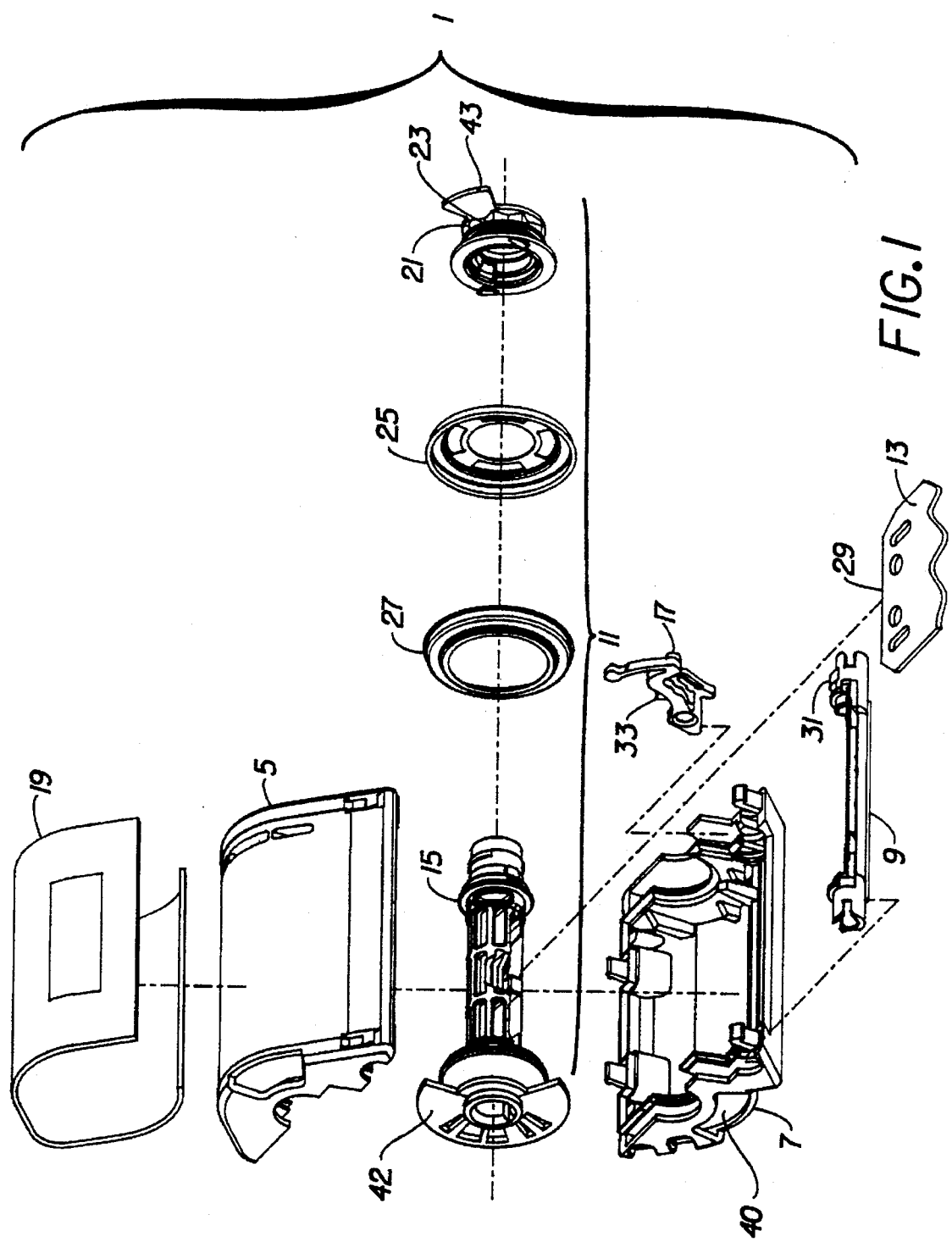
FIG. 1 is an exploded perspective view of a film cassette in accordance with a preferred embodiment of the present invention.

Referring now to the drawings, FIG. 1 is an exploded perspective view of a film cassette 1 in accordance with a preferred embodiment of the invention. Generally, the film cassette 1 comprises a cassette shell 3, FIG. 2, constructed of carbon-black plastic material and made up of two mating shell halves 5 and 7, a similarly constructed light shielding door 9 closed to prevent ambient light from entering the cassette interior through a film ingress/egress slot located between the two shell halves and opened to permit film movement into and out of the cassette interior via the film ingress/egress slot, a film spool 11, FIG. 2, supported for rotation inside the cassette shell in opposite film unwinding and winding directions to unwind a filmstrip 13 off a spool core 15 and to wind the filmstrip 13 onto the spool core, a spool lock 17 for engaging the spool core to prevent rotation of the film spool and out of engagement to release the film spool, and a cassette covering label 19.

Figure 5:
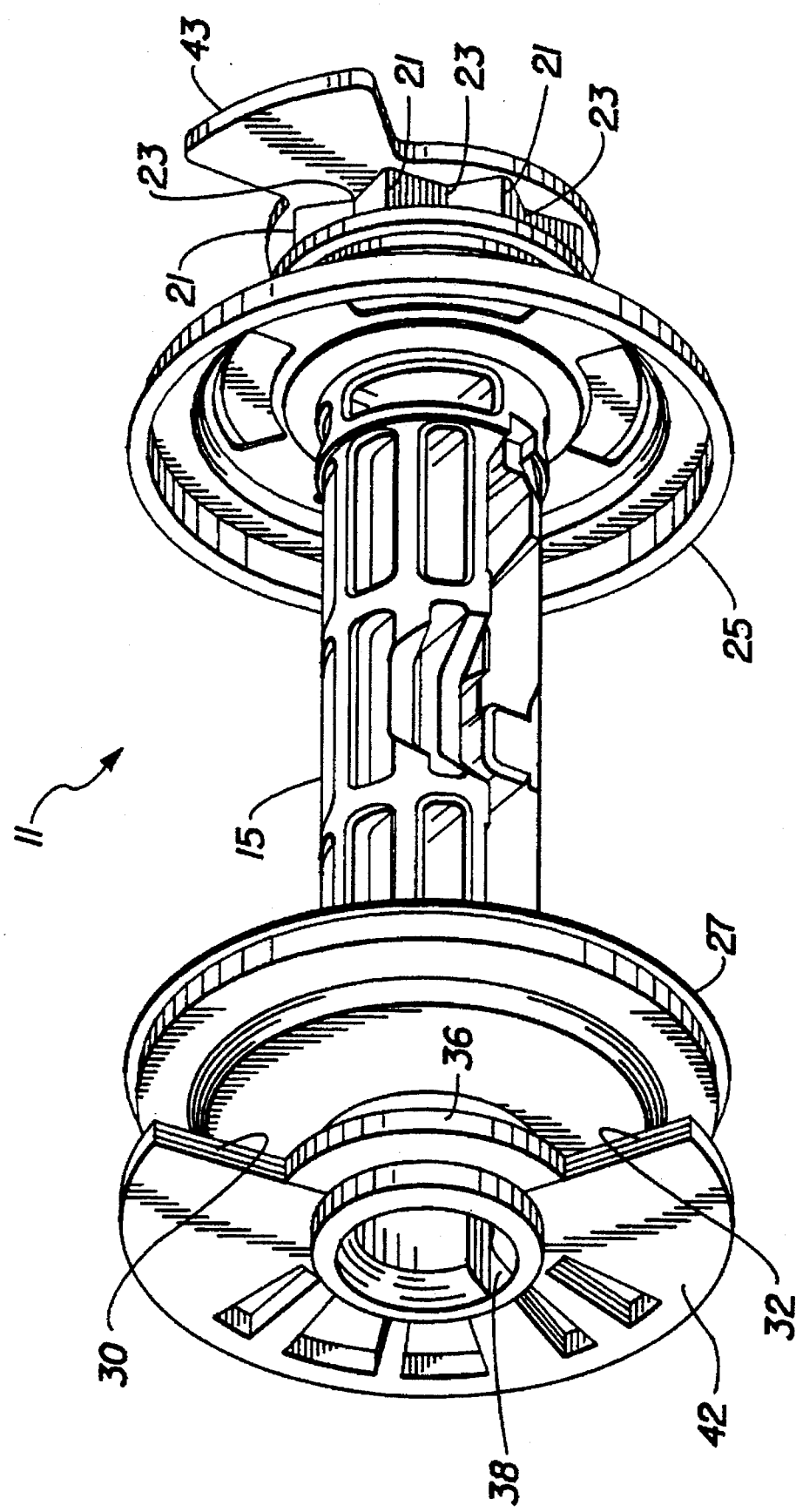
FIG. 5 is an assembled perspective view of the film spool of the film cassette.

The spool core 15, as shown in FIGS. 1 and 5, has a toothed periphery consisting of successive symmetrical teeth 21 separated by interdental spaces 23, and the spool core also supports a pair of coaxial flanged disks 25 and 27 between which the filmstrip is stored in roll form. A trailing or inner end 29 of the filmstrip 13 is attached to the spool core 15.

Figure 2:
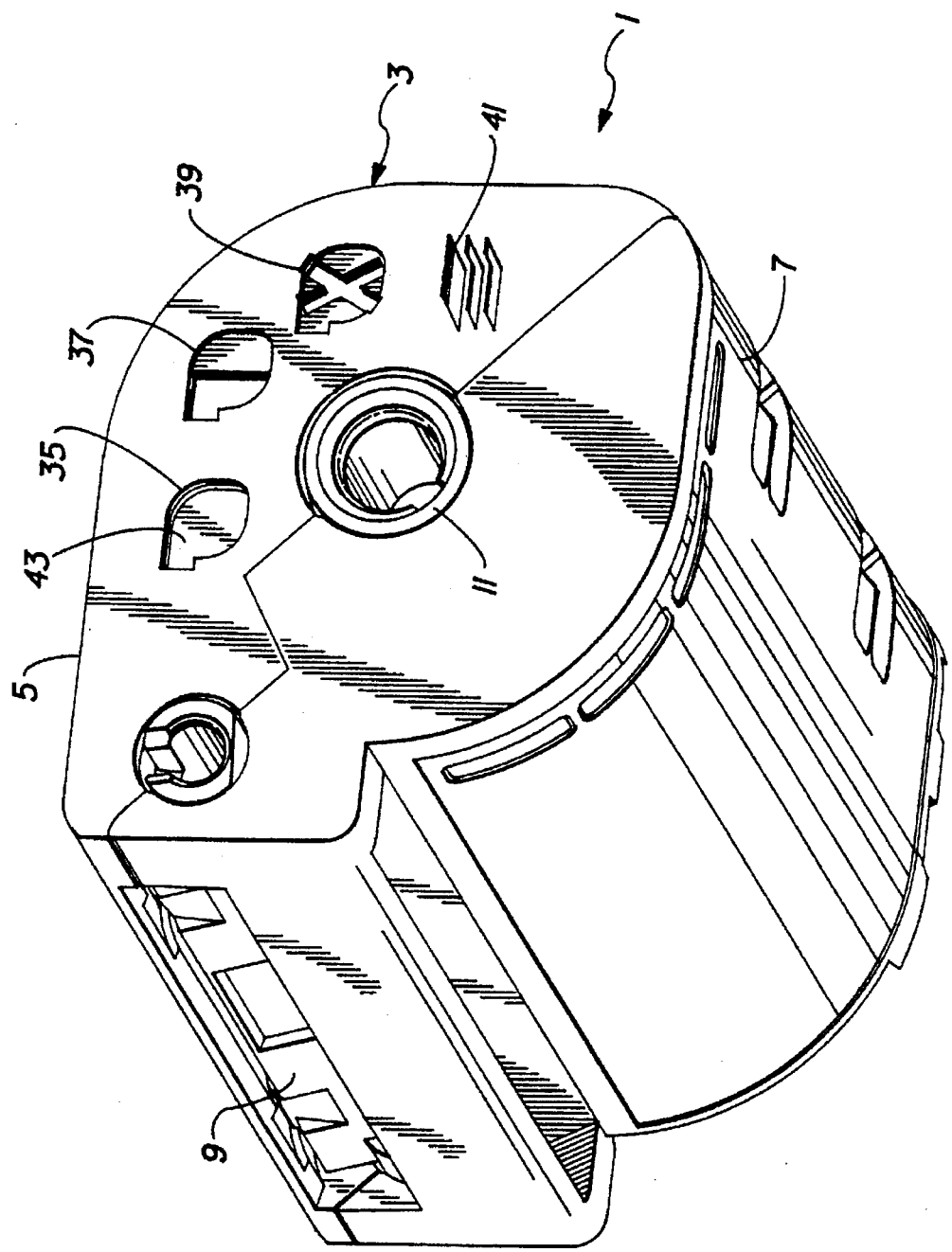
FIG. 2 is an assembled perspective view of the film cassette as seen from one end of the cassette shell.
Figure 3:
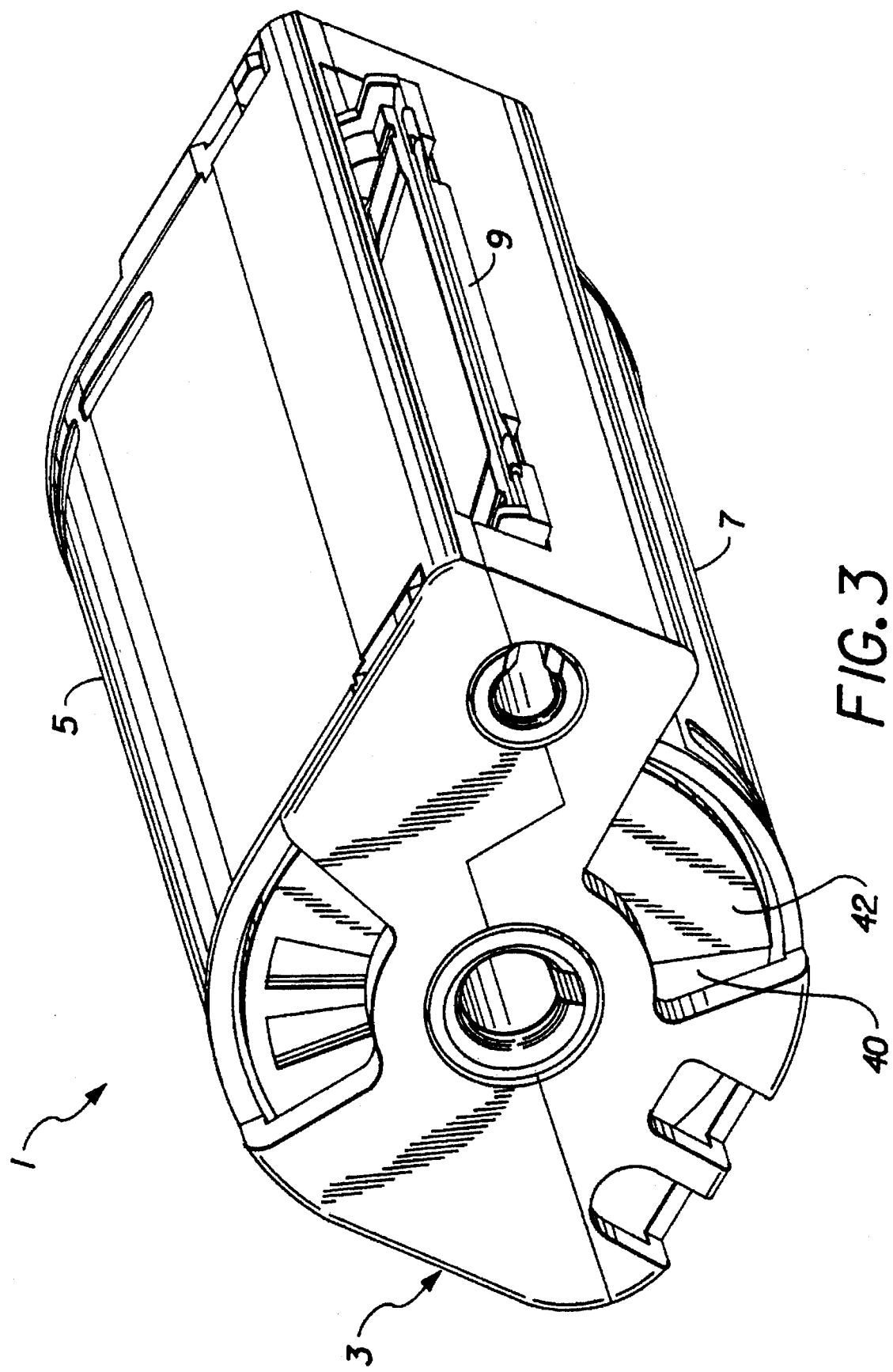
FIG. 3 is an assembled perspective view of the film cassette as seen from the other end of the cassette shell.
Figure 4:
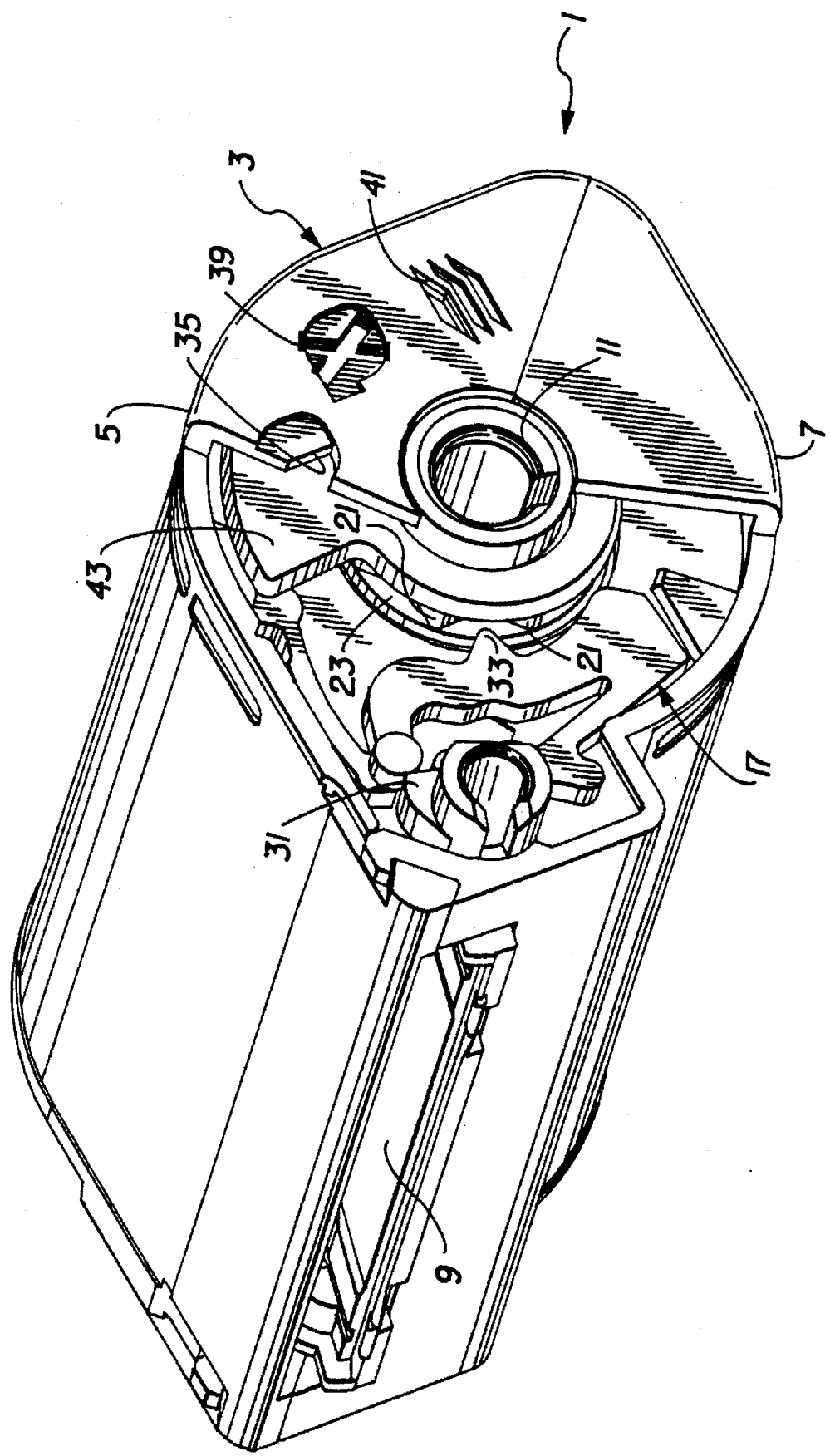
FIG. 4 is an assembled perspective view of the film cassette depicted with part of the cassette shell cut away to show a spool lock.

The light shielding door 9, as shown in FIGS. 2–4 includes integral cam means 31 for pivoting the spool lock 17 in a locking position as the door is closed. When the spool lock 17 is in its locked position, not shown, an integral detent 33 of the spool lock is located in anyone of the interdental spaces between two adjacent teeth 21 of the spool core 15 in anyone of a number of rotational orientations equal to the number of interdental spaces. If the light-shielding door 9 is opened as shown in FIG. 3, its cam means 31 is retracted from the spool lock 17. As a result, forcible rotation of the film spool 11 in the film winding or unwinding direction will cause one of the two adjacent teeth 21 between which the detent 33 is located to eject the detent from the interdental space 23 separating those two teeth. Thus, the spool lock 17 will be pivoted out of its locking position.

The Film Exposure-Status Indicating Means Of The Film Cassette

The shell half 5 at one of its ends has four icons in the form of respective cutouts 35, 37, 39, and 41 shown in FIG. 2. The cutout 35 is designed to effect an indication that the filmstrip 13 is fresh or unexposed. The cutout 37 is designed to effect an indication that the filmstrip 13 is partly exposed (and partly unexposed). The cutout 39 is designed to effect an indication that the filmstrip 13 is fully exposed. The cutout 41 is designed to effect an indication that the filmstrip 13 has been processed in a film processing machine to develop the latent images on the exposed film.

An indicator flag 43 is coaxially fixed to the spool core 15 at the remaining end of the spool opposite to the indicating status end of the cassette, as shown in FIGS. 1 and 5, to be rotated with the film spool 11 in the film unwinding and film winding directions. Initially, the flag 43 is secured with the film spool 11 in a rotational orientation that locates the flag immediately beneath the cutout 35 as shown in FIG. 3, to provide an indication that the filmstrip is fresh or unexposed. Conversely, when the flag 43 is secured with the film spool 11 in a rotational orientation that locates the flag immediately beneath the cut-out 37, it is visible to provide an indication that the filmstrip 13 is partly exposed (and partly unexposed). When the flag 43 is secured with the film spool 11 in a rotational orientation that locates the flag immediately beneath the cut-out 39, it is visible to provide an indication that the filmstrip is fully exposed. When the flag 43 is secured with the film spool 11 in a rotational orientation that locates the flag immediately beneath the cut-out 41, it is visible to provide an indication that the filmstrip 13 has been processed.

The film spool 11, as shown in FIGS. 1,3, 5 and 6 includes a plastic disk 42 having a semi-circular configuration; that is, "c" shaped, including a central opening 28, and a pair of extreme ends 30 and 32. The spool core 15 longitudinally extends through the central opening 28 of the disk 42 and has a peripheral groove 34 in which the disk is seated to secure the disk and the spool core coaxially together. A registration stop 36 is fixed to the spool core 15 adjacent the peripheral groove 34, and has a pair of stop ends arranged to abut the extreme ends 30 and 32 of the disk to critically orient the disk 42 with respect to a key slot 38 of the spool core.

A window 40 is provided in the shell half 7, FIG. 1. The window 40 is intended to provide status indication of the film 13 contained in the cassette 1 in cooperation with the disk 42, the spool core 11 and the indicator flag 43. When the disk 42 covers the entirety of the window 40, FIG. 3, the film contained within the cassette 1 is wholly unexposed. When a portion (approximately one half) of the window 40 is coveredby the disk 42, there is partly exposed film contained in the cassette, corresponding to the indicator flag 43 being present in the cutout 37 at the other end of the cassette. Finally, when all of the film in the cassette is exposed, the disk 42 is not visible in the window 40. Additional details regarding the described cassette are found in commonly assigned U.S. Pat. No. 5,296,887, issued to Zander, which is hereby incorporated by reference.

DOUBLE EXPOSURE PREVENTION MEANS

Figure 7:
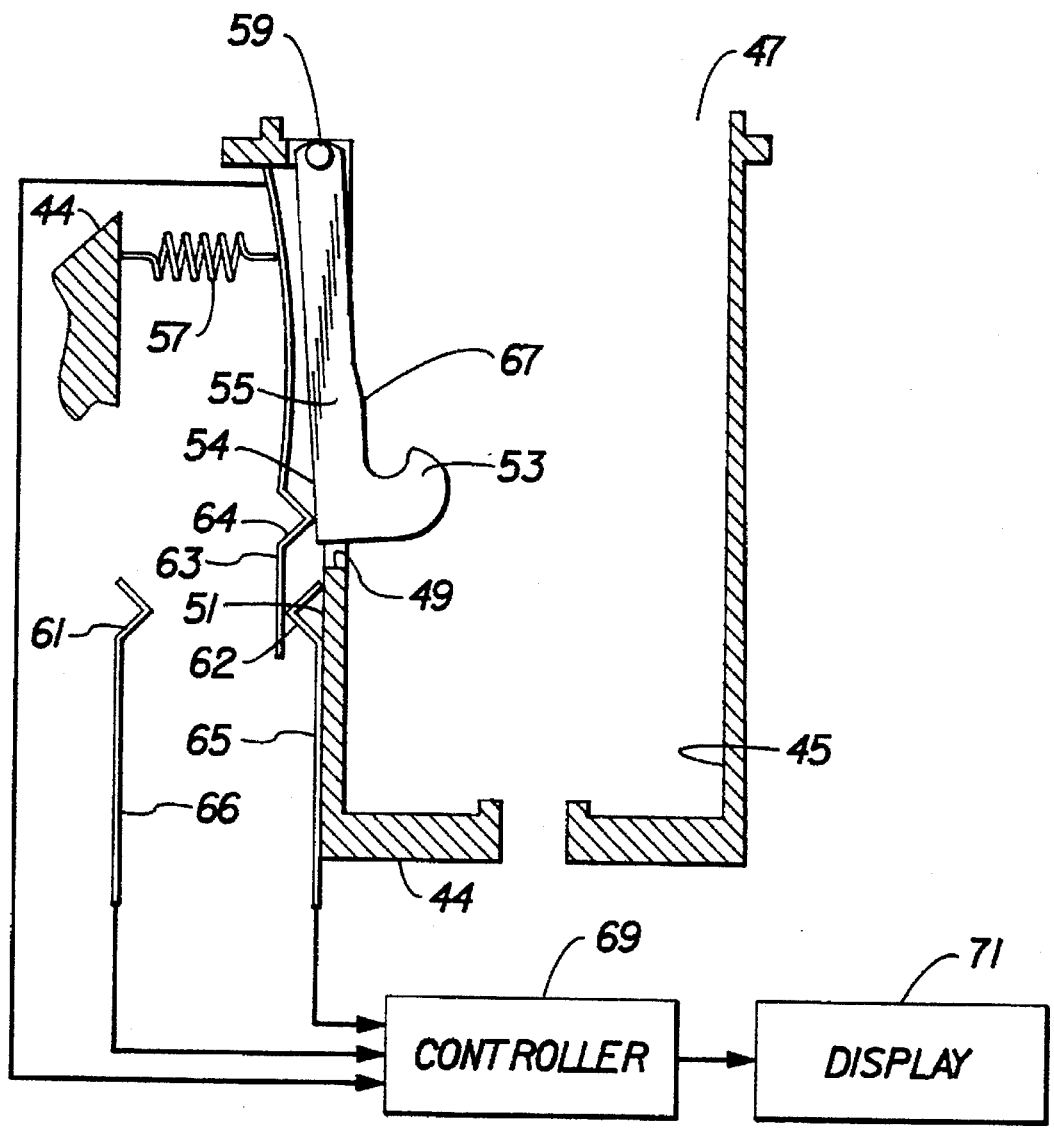
FIG. 7 is a diagrammatic view, taken partially in section and partially schematic, of a film loading chamber having a double exposure prevention apparatus which includes a multiple state sensing switch according to a first embodiment.
Figure 8:
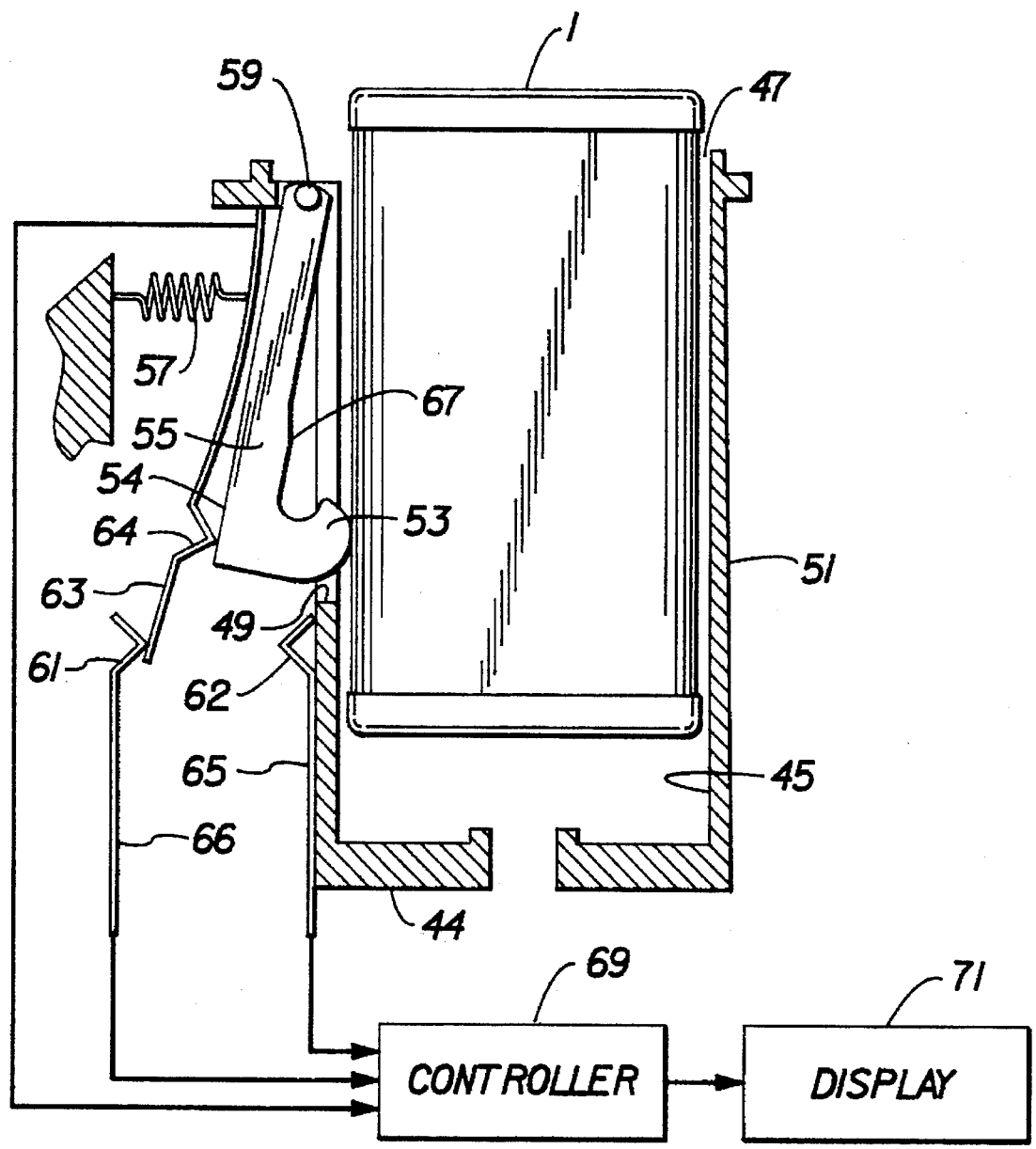
FIG. 8 is the partial sectional schematic view of FIG. 7, showing the loading of an unexposed film cartridge at an intermediate position relative to the double exposure prevention apparatus, including the multiple state sensing switch.
Figure 9:
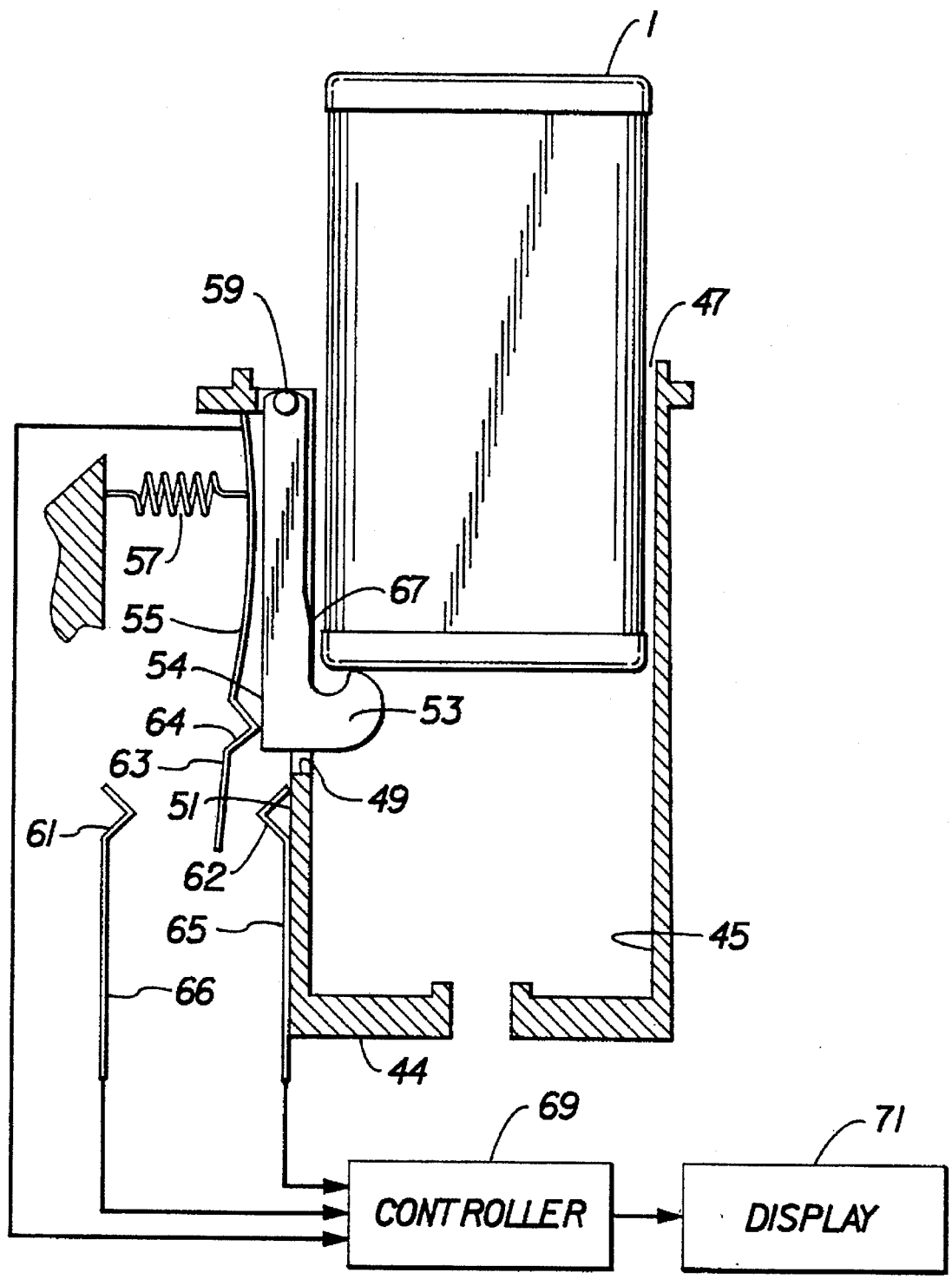
FIG. 9 is the partial sectional view of the film loading chamber of FIGS. 7 and 8, shown partially as a schematic, illustrating the film cartridge in a substantially loaded position; and, FIGS. 10(a)–10(c) are partial sectional views of a film loading chamber having a double exposure prevention apparatus, including a multiple state sensing switch according to a second embodiment.

Referring now to FIGS. 7–9, a first embodiment is described which pertains to a double exposure prevention apparatus in accordance with the present invention.

Referring specifically to FIG. 7, a film cassette 1 such as described above can be loaded endwise into a camera body 44 having a film loading chamber 45, sized for receiving the film cassette and defined by an entry opening 47. The chamber 45 includes a sidewall 51 having an aperture or slot 49 through which protrudes a hook-shaped end 53 of a blocking member 55 which is pivotable about a support pin 59. The aperture 49 is preferably aligned with the window 40 of the status indicator end of a loaded cassette 1, so that the biased hook-shaped end 53 will engage the plastic disk 42 of a cassette containing fully unexposed film when the disk is present.

According to this embodiment, a switch element 63, preferably made from a spring-like material, is mounted at one end to the camera body 44 adjacent to the support pin 59, and includes a protruding portion 64 which is biased in contact with a back surface 54 of the blocking member 55. A helical compression spring 57 normally biases the protruding portion 64 into the back surface of the blocking member 55 and the hook-shaped end 53 into the confines of the chamber 45.

The switch element 63 extends across the aperture 49, and is also biased at its remaining end by the helical spring 57 into contact with a contact portion 62 of a first contact surface 65, mounted to the exterior of the sidewall 51. A contact portion 61 of a parallel second contact surface 66 is also provided and is spaced from the first contact surface 65.

Figure 6:
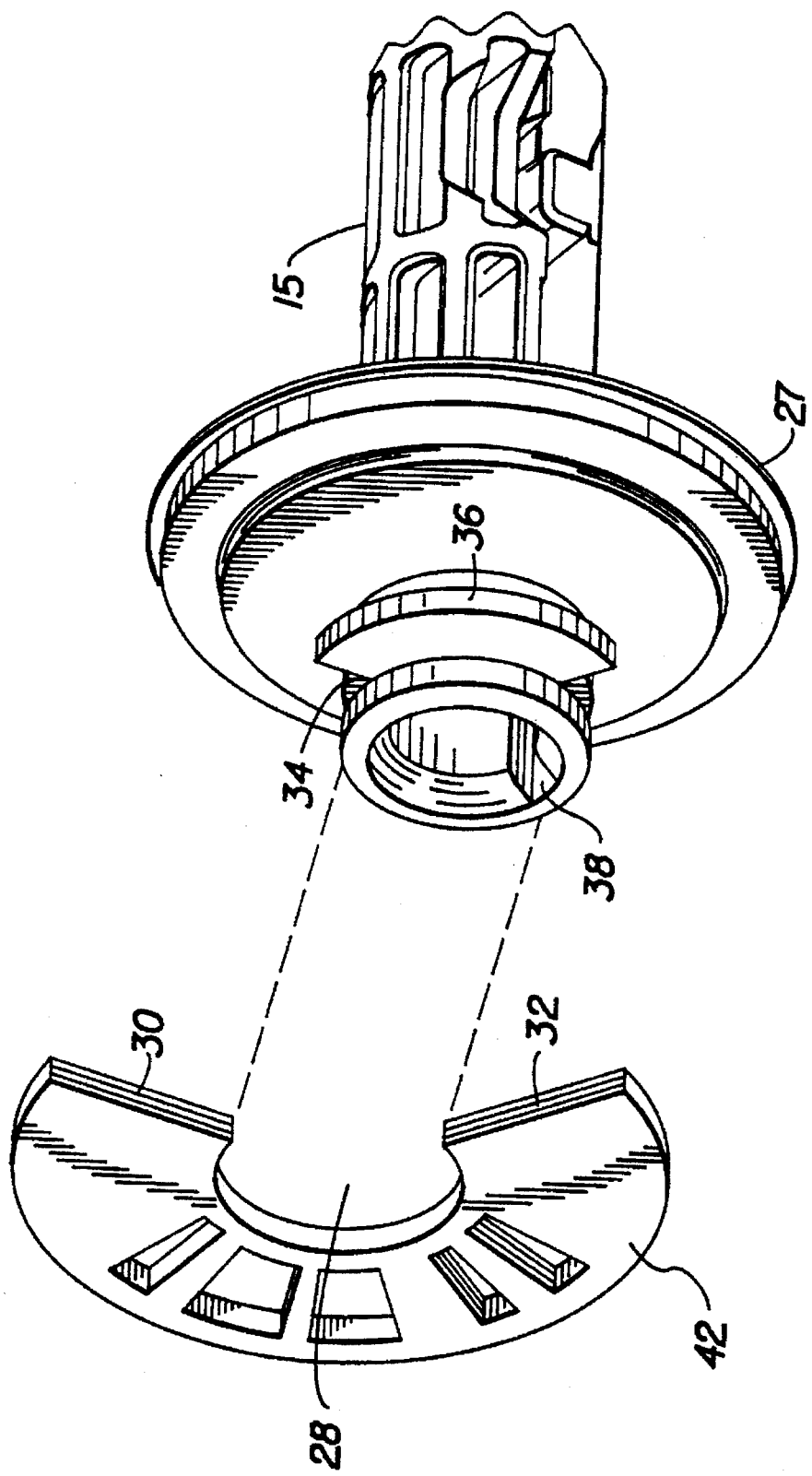
FIG. 6 is an exploded perspective view of one end of the film spool of the film cassette.

The switch portion 63 and the first and second contact surfaces 65, 66 each provide electrical inputs to an interconnected controller 69, such as a microprocessor having logic for enabling a display device 71, FIG. 6. The display device 71 can be an icon, a light emitting device, such as a lamp, or in the case of the present embodiment an LCD array element capable of printing a plurality of messages, depending on the state of the apparatus. The display device 71 is only shown schematically according to FIGS. 7–9, though it can be disposed conveniently, such as on the exterior of the camera body 44, in a manner commonly known.

The operation of the invention can now be described by FIGS. 7–9. Referring again specifically to FIG. 7, the film loading chamber 45 is shown in section prior to the loading of a film cassette 1. When no film cassette 1 is present in the chamber 45, the blocking member 55 is fully biased into the interior of the chamber 45 through the sidewall aperture 49 by the spring forces supplied by switch element 63 and spring 57. The switch portion 63 is also normally biased in a first position into contact with the first contact surface 65, forming a closed electrical switch connection, sensed by the controller 69.

Alternately, the switch element 63 can be used as a spring for simultaneously biasing the blocking member 55 and the switch element 63, eliminating the need for spring 57. Details relating to this particular arrangement are described in commonly assigned and concurrently filed U.S. patent application Ser. No. 08/385,291 filed by Robert L. Kuhn, Jr., which is incorporated by reference herein.

According to the present embodiment, when the camera is powered, such as by a battery (not shown) or other power supply, the controller 69 is programmed to send a signal to the display device 71, in this case the LCD, conveniently positioned on the camera body 44, to display a message which is viewable to the user. Preferably, the controller 69 is programmed to enable the display device 71 after the film loading chamber door (not shown) covering the entry opening 47 is closed. A message such as "CHAMBER EMPTY" or "NO CARTRIDGE PRESENT", can then be displayed by the display device 71.

Alternatively, any other graphic or icon-like characters can be displayed which are representative of this first state of the apparatus; for example, a light emitting element (not shown) can be substituted for the LCD in which a single light signal could be generated to indicate that the chamber is empty.

FIG. 8 illustrates the sectional view of the above apparatus when a film cassette 1 has been loaded endwise, status indicator side first, an intermediate distance into the loading chamber 45.

Prior to interfacing with the hook-shaped end 53 of the blocking member 55, the cassette 1 first engages an extending guide portion 67, see FIGS. 7 and 8. This engagement slightly urges the blocking member 55, in a clockwise direction about the support pin 59, towards the exterior of the chamber 45. Preferably, the guide portion 67 is tapered in order to prevent the cassette 1 from binding prior to engagement with the hook-shaped end 53. The slight movement of the blocking member 55 allows the hook-shaped end 53 to be better aligned with the window 40, FIG. 3, of the loaded film cassette 1.

In addition, the slight pivoting movement of the blocking member 55 due to the contact with the guide portion 67 is also preferably sufficient to overcome the biasing of the switch element 63. As seen, from the FIG., the switch element 63 is forced out of contact with the contact portion 62 of the first contact surface 65, causing an opening of the electrical connection between the switch and the contact portion 62, sensed by the controller 69. The controller 69 is programmed to transmit an input signal to the display device 71 which removes the first displayed message and while also initiating a timer circuit (not shown), described below.

Still referring to FIG. 8, as the film cassette 1 continues to move endwise into the chamber, the hook-shaped end 53 of the blocking member 55 engages the status indicator end of the film cassette 1, which is shown only diagrammatically in the FIG. According to this embodiment, if the film contained within the cassette 1 has been previously exposed, either wholly or in part, then the blocking member 55 will not allow the film cassette 1 to descend further into the chamber 45. The cassette 1 is effectively blocked in that the plastic disk 42, FIG. 3, is not present in the window 40; therefore, the hook-shaped end 53 will pass unimpeded into the window 40, sized for receiving the hook-shaped end, and will bind against the interior of the cassette shell. If, however, the film cassette 1 contains fresh or previously unexposed film, then the plastic disk 42, FIG. 3, will be present in the window 40 and will contact the hook-shaped end 53 of the blocking member 55. The contact between the plastic disk 42 and the hook-shaped end 53 is adequate to overcome the biasing force supplied by the spring 57, and the cassette urges the blocking member 55 out of the chamber 45 by pivoting about the support pin 59. The unblocked cassette 1 can then be successfully loaded into the chamber 45. Additional details relating to the operation of the blocking member 55 relative to an exposed, fully exposed, or partially exposed film cassette 1 can be found in commonly assigned U.S. Pat. Nos. 4,994,828, 5,032,861 and U.S. Pat. No. 5,049,913, the contents of which are hereby incorporated by reference.

As noted above, the slight movement of the blocking member 55 is sufficient to break the contact of the switch element 63 with the first contact surface 65. This occurs whether the cassette 1 has exposed, partly exposed, or unexposed film contained therein. The breaking of the electrical connection between the cartridge presence sensor switch 63 and the contact surface 65 is sensed by the controller 69. In response, the controller 69 is programmed to send a signal to the display device 71 in order to provide a second message for viewing by the user. This second message may include such information as "NO INSERTION ALLOWED" or "PREVIOUSLY EXPOSED CARTRIDGE PRESENT" or a similar message, although any graphic or icon characters representative of the state of the camera and the cassette 1 can be used. Alternatively, a light emitting element (not shown) may be substituted as a display device for the LCD.

As noted above, the controller 69 preferably includes a timing circuit which prevents the display of the second message by the display device 71 until a predetermined period of time (e.g. 2-3 seconds) has elapsed. The timing circuit is provided to insure that the second message be displayed only if a cassette is blocked by the blocking member to avoid confusion to a user.

Referring now to FIG. 9, a portion of an unblocked film cassette 1, containing an unexposed film, has descended vertically below the aperture 49 into the loading chamber 45, causing the blocking member 55 to overcome the spring force supplied by the spring 57 and be fully urged out of the chamber. The length of travel of the blocking member 55 is sufficient to enable the rear surface 54 of the blocking member 55 to push the switch element 63 into biased contact with the contact portion 61 of the second contact surface 66, forming a second electrical connection sensed by the controller 69. The logic within the controller 69 provides another signal to the display device 71 for indicating a third message, representative of the state of the apparatus for viewing by the user. The third message may include such information as "INSERTION ALLOWED" or "CARTRIDGE LOADED", or may include alternatively, any graphic or icon characters which are representative.

The film contained within the cassette 1 is now ready to be loaded into the camera. Preferably, the controller 69 senses the closing of the film chamber door (not shown), and the closed electrical connection between the switch element 63 and the second contact surface 66, indicating that a film cassette containing exposable film is present in the loading chamber. If both conditions are present, then the controller 69 enables the film to be loaded from the cassette. Reloading of film from the cassette 1 is prevented by the controller 69 until the switch member 63 has been reset into contact with the first contact surface 65 and subsequently forced by the blocking member 55 into contact with the second contact surface 66. This particular apparatus is described in the commonly assigned U.S. patent application Ser. Nos. 08/385,291 and 08/386792 entitled: DOUBLE EXPOSURE PREVENTION MEANS FOR CAMERAS USING THRUST TYPE CARTRIDGES, filed concurrently herewith and which are incorporated by reference.

ALTERNATE EMBODIMENT OF A MULTIPLE STATE CARTRIDGE SENSING DEVICE

Figure 10A:
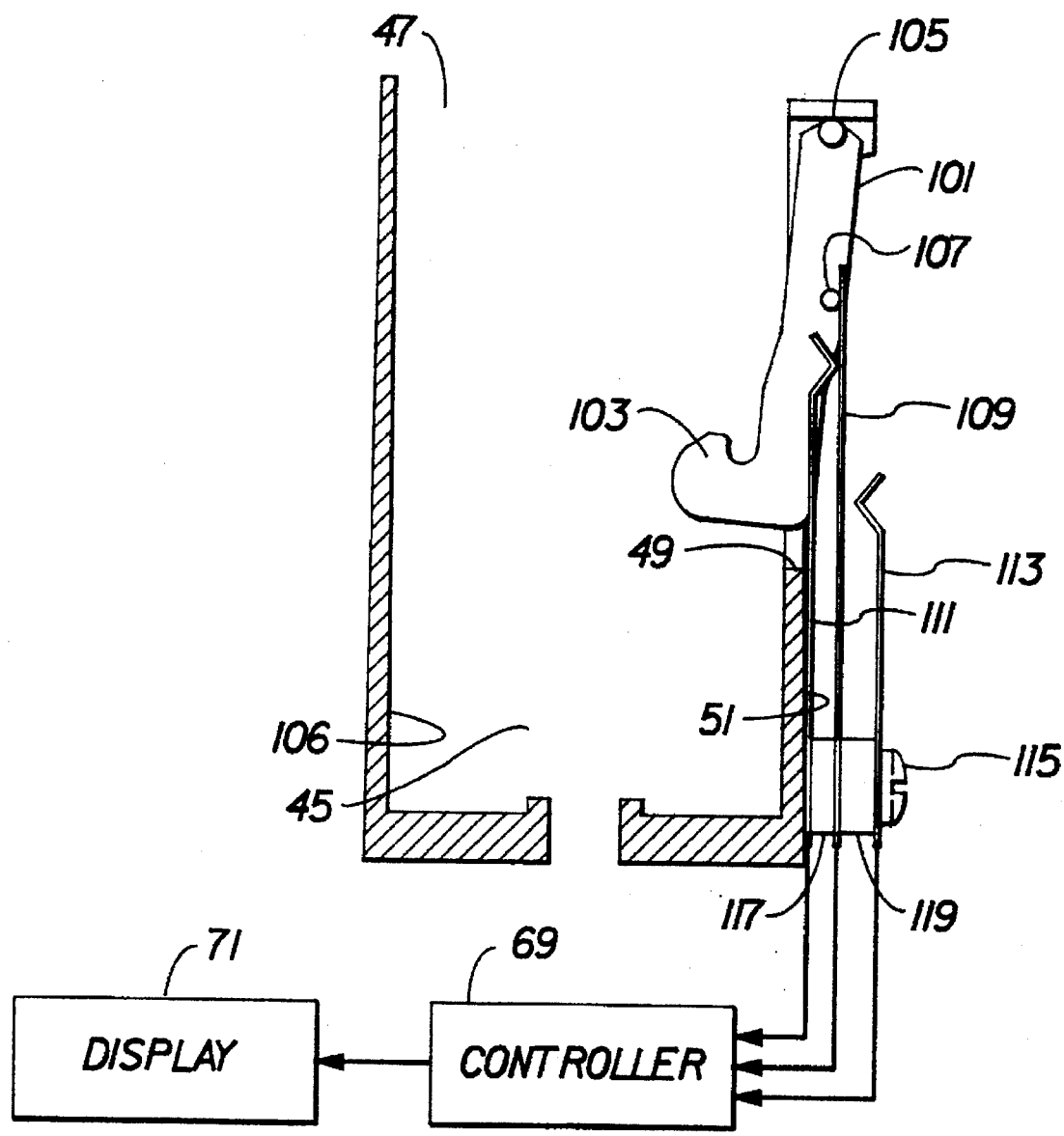
Figure 10B:
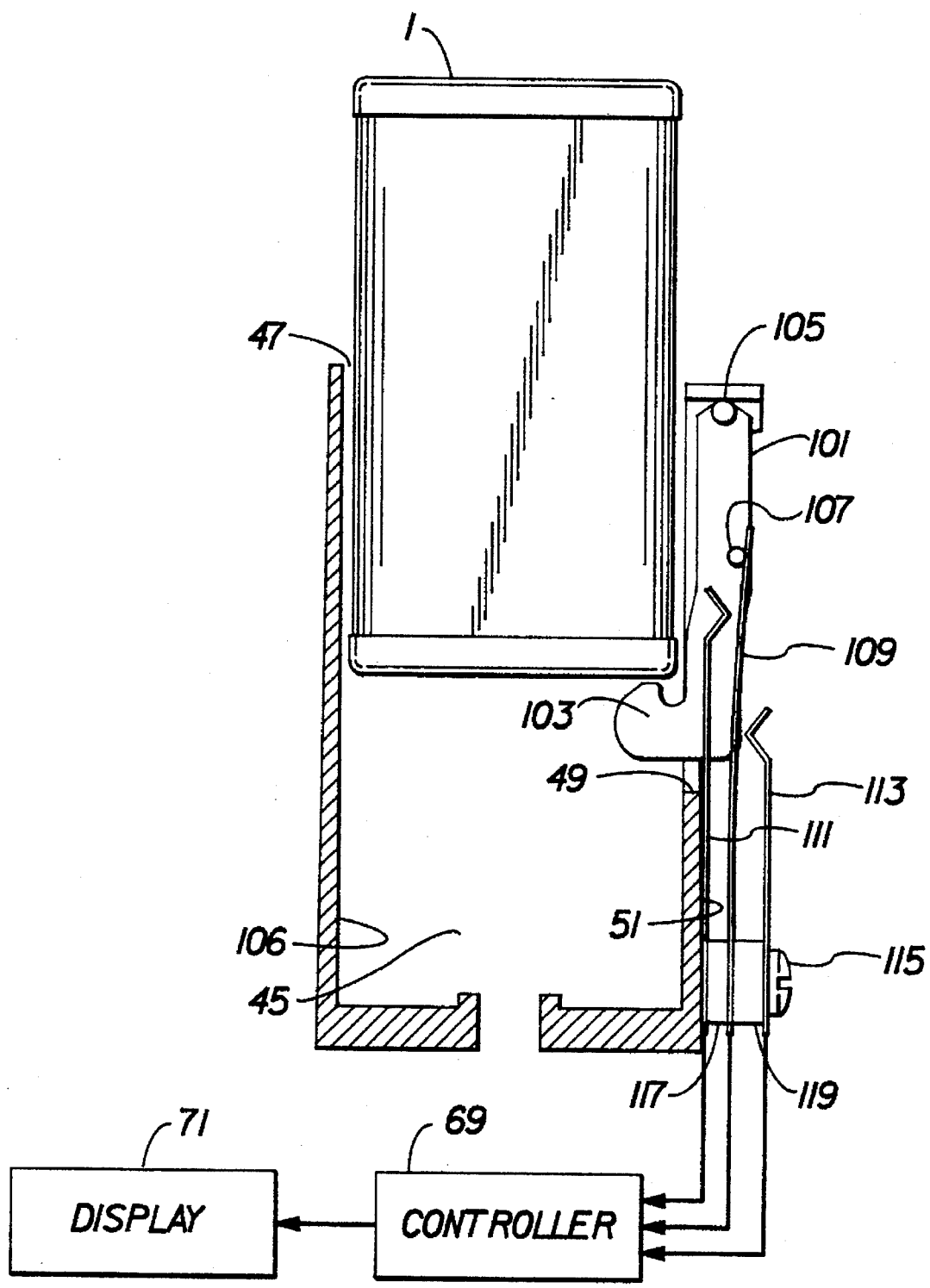
Figure 10C:
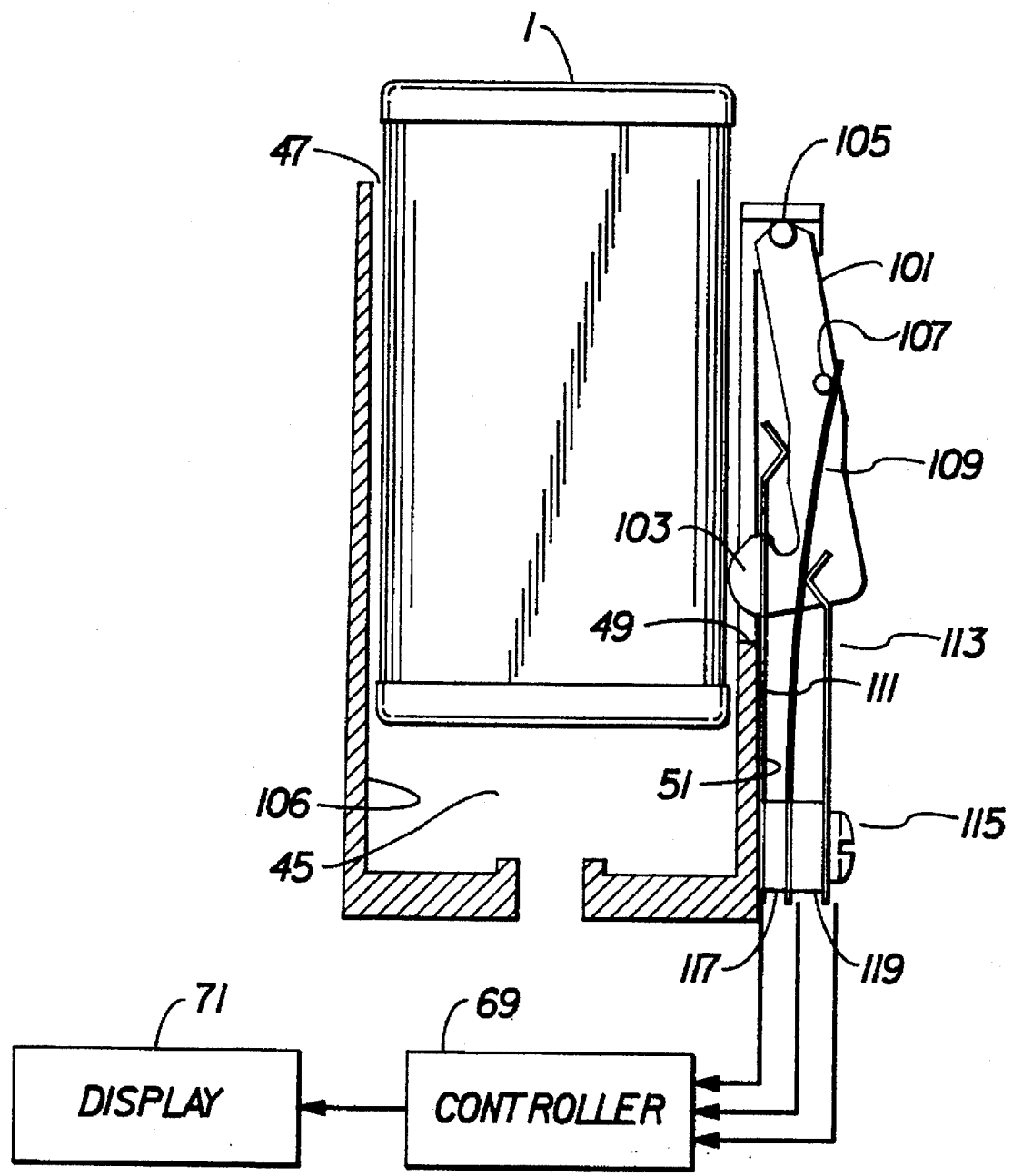

Referring now to FIGS. 10(a)–10(c), an alternate embodiment of the present invention is herein described. Similar parts are labeled using the same reference numerals used in the preceding embodiment for clarity.

A camera body 44 includes a loading chamber 45 having an entry opening 47 for receiving a film cassette 1, in an endwise manner as previously described. The hook-shaped end 103 of a blocking member 101 is biased, FIG. 10(a), into the cavity of the chamber 45 which is pivotally mounted to the camera body 44 by means of a support pin 105.

One end of a switch member 109 is mounted to the exterior of the sidewall 51 of the chamber 45 adjacent the bottom of the chamber cavity and is sandwiched between a pair of contact surfaces 111 and 113, all being attached at one end to the exterior sidewall 51 of the chamber 45. According to this embodiment, the contact surfaces 111, 113 are separated by insulated spacers 117, 119, all attached to the sidewall 51 by a mounting screw 115.

The remaining end of the switch member 109 is mounted to the rear of the blocking member 101 at a support 107 and biases the hook-shaped end 103 of the blocking member 101 into the chamber 45, as well as into contact with the first contact surface 111 in a normal position. Each of the contact surfaces 111, 113, as well as the switch member 109, are electrically attached to a controller 69 which is powered by a power supply (not shown). such as a battery. In the normal position, the switch element 109 is biased into contact with the first contact surface 111, creating a first electrical connection which is sensed by the controller 69. The controller 69 is also attached to a display device 71, such as an LCD or other similar device, which is preferably visible on the exterior of the camera body. The connection between the switch member 109 and the first contact surface 111 is sensed by the controller 69 which in response sends an output signal activating the display device 71, and creating a first user message. In this case, a message such as "CARTRIDGE CHAMBER EMPTY", "LOAD CAMERA" or other suitable message representative of the first state of the apparatus is suitable.

As a film cassette 1 is lowered into the chamber 45 through opening 47, FIG. 10(b), the bottom and side walls of the cassette shell contact the interior surface 106 causing the blocking member 101 to be urged slightly out of the chamber 45, though the blocking member is still biased by the switch member 109, which is supported by screw 115. The movement of the blocking member 101 due to the presence of the film cassette 1, however, is sufficient to cause the switch member 109 to be displaced out of contact with the first contact surface 111 due to the connection of the switch member at support 107. The breaking of the electrical connection between the switch element 109 and the contact surface 111 is sensed by the controller 69 which is programmed to cancel the display of the first message by the display device and start a timing circuit within the controller 69, as is described below.

As the cassette 1 passes the aperture 49, FIG. 10(c), the hook-shaped end 103 is urged fully out of the chamber 45. The movement of the blocking member 101 overcomes the spring force supplied by the switch member 109, causing the switch member to deflect until contact is made with the second contact surface 113. The contact between surface 113 and the switch member 109 creates a second electrical connection which is sensed by the controller 69 which is programmed to send a signal to the display device 71 to display a second message. In this case, a message such as "CARTRIDGE LOADED" OR "LOAD FILM" or any other message representative of this state of the camera can be displayed by the LCD. If the cassette 1 contains partly or fully exposed film then the hook-shaped end 53 will remain engaged with an aligned window 40, FIG. 2, of the cassette 1. The timing circuit of the controller 69 which is activated after the switch element 109 is displaced from the first contact surface 107, thereafter causes the display of a separate message by the LCD 71 if contact between surface 113 and switch portion 109 is not made within 2–3 seconds, or other reasonable period of time. This message can state "NO INSERTION PERMITTED" or "EXPOSED CARTRIDGE IN CHAMBER" or other message representative of the state of the apparatus.

The logic of the controller 69 automatically causes the film contained within the cassette to be loaded within the camera after the film door (not shown) is closed and the load film flag has been set, due to the opening of the switch 63.

In addition, after a film cassette 1 has loaded the film by thrusting the film leader (not shown) across the exposure gate (not shown) of the camera, the controller 69 can clear the film load flag which was set by the breaking of contact between the switch member 109 and the contact surface 111. At this stage, the film loading means (not shown) of the camera can not be reactivated until the switch member 109 has been reclosed and subsequently reopened, by a loaded film cassette. The controller 69 can be programmed to send a signal to the display device 71 to send a fourth message after the film has been exposed and rewound in the film cassette 1. A message such as "UNLOAD CARTRIDGE" or "FILM EXPOSED", or any other message representative of the state of the camera is suitable.

The invention has been described with reference to a preferred embodiment. However, it will be appreciated that variations and modifications can be effected by a person of ordinary skill in the art without departing from the scope of the invention.

PARTS LIST FOR FIGS. 1–10(c)

| | |
|---|---|
| 1 | film cassette |
| 3 | cassette shell |
| 5 | shell half |
| 7 | shell half |
| 9 | light shielding door |
| 11 | film spool |
| 13 | filmstrip |
| 15 | spool core |
| 17 | spool lock |
| 19 | covering label |
| 21 | spool teeth |
| 23 | interdental spaces |
| 25 | spool disk |
| 27 | spool disk |
| 28 | central opening |
| 29 | trailing film end |
| 30 | extreme end |
| 31 | camming means |
| 32 | extreme end |
| 33 | detent |
| 34 | peripheral groove |
| 35 | cutout |
| 36 | registration stop |
| 37 | cutout |
| 38 | key slot |
| 39 | cutout |
| 40 | window |
| 41 | cutout |
| 42 | plastic disk |
| 43 | indicator flag |
| 44 | camera body |
| 45 | loading chamber |
| 47 | entry opening |
| 49 | slot |
| 51 | sidewall |
| 53 | hook-shaped end |

-continued

PARTS LIST FOR FIGS. 1–10(c)

| | |
|---|---|
| 54 | rear surface |
| 55 | blocking member |
| 59 | support pin |
| 61 | contact portion |
| 62 | contact portion |
| 63 | switch element |
| 64 | mounting plate |
| 65 | first contact surface |
| 66 | second contact surface |
| 67 | protruding portion |
| 69 | controller |
| 71 | display device |
| 101 | blocking member |
| 103 | hook-shaped end |
| 105 | contour |
| 106 | interior surface |
| 107 | support |
| 109 | switch member |
| 111 | first contact surface |
| 113 | second contact surface |
| 115 | screw |
| 117 | insulated spacer |
| 119 | insulated spacer |

I claim:

1. An apparatus for displaying the status of a film cartridge in a camera, said cartridge having a film exposure status indicator for identifying whether said cassette contains film which is fully unexposed, partially exposed, or fully exposed, said apparatus including a blocking member which cooperates with the status indicator of said cartridge to prevent the loading of a fully exposed film cartridge, is characterized by:

sensing means which cooperate with the blocking member for sensing the presence of a film cartridge in said loading chamber; and display means cooperating with said sensing means for displaying the status of said camera depending on whether a film cartridge is present in said chamber.

2. An apparatus as recited in claim 1, wherein said sensing means includes switching means capable of assuming separate states depending on whether no cartridge is present in said chamber, a blocked cartridge is in said chamber, or an unblocked cartridge is in said chamber.

3. An apparatus as recited in claim 2, wherein said switching means includes a movable switching element which cooperates with said blocking member to move from a first position when no cartridge is present in said chamber, to a second position when a cartridge is inserted in said chamber, to a third position when an unblocked cartridge is loaded in said chamber.

4. An apparatus as recited in claim 3, wherein said display means includes an visually indicating portion which can be varied depending on the state of said switching element.

5. An apparatus as recited in claim 4, wherein said display means includes a LCD device which is capable of visually presenting a plurality of messages depending on the state of said switching element.

6. The apparatus as recited in claim 4, including biasing means for biasing said switching element into said first position.

7. An apparatus for displaying the status of a film cartridge in a camera, said cartridge having a film exposure status indicator for identifying whether said cassette contains film which is fully unexposed, partially exposed, or fully exposed, said apparatus including a blocking member which cooperates with the status indicator of said cartridge to prevent the loading of a fully exposed film cartridge, is characterized by:

a movable switching element which cooperates with the blocking member to move from a first position when no cartridge is present in said film loading chamber to a second position when a cartridge containing exposed film is blocked in said chamber, and to a third position when a cartridge is unblocked by said blocking member; and, a display device coupled to said switching element for displaying a visually perceivable indication as to the state of the camera loading chamber.

8. An apparatus as recited in claim 7, wherein said display device is an LCD element capable of presenting a plurality of user messages depending on the position of said switching element.

9. An apparatus as recited in claim 7, including biasing means for biasing said switching element in said first position when a film cartridge is not present in said chamber.

* * * * *